Figure 1:
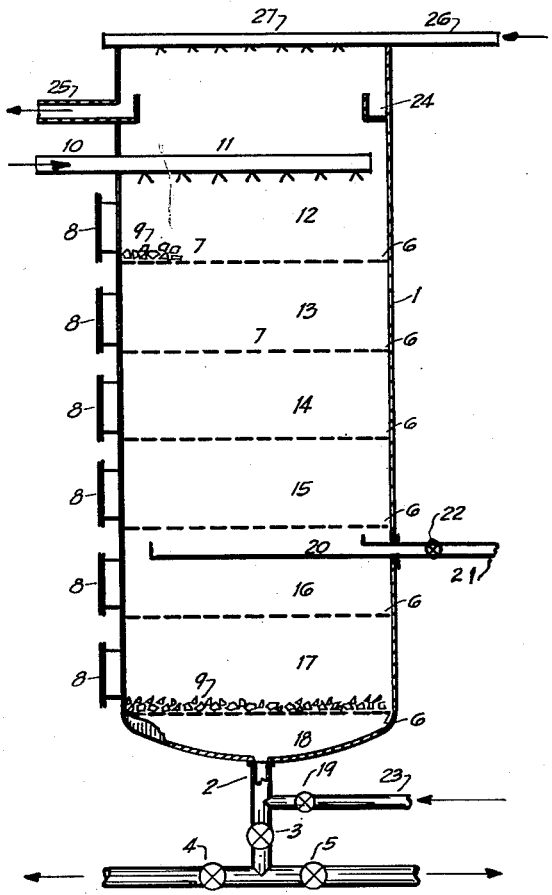

Nov. 27, 1956  H. L. COONRADT ET AL  2,772,236
METHOD FOR REDUCING FRACTURING OF ION-EXCHANGE RESINS
Filed April 25, 1952

INVENTORS
HARRY L. COONRADT
WILBUR K. LEAMAN
BY
Francis F. Johnston
AGENT

United States Patent Office 2,772,236
Patented Nov. 27, 1956

2,772,236

METHOD FOR REDUCING FRACTURING OF ION-EXCHANGE RESINS

Harry L. Coonradt, Woodbury, and Wilbur K. Leaman, Pitman, N. J., assignors to Socony Mobil Oil Company, Inc., a corporation of New York Application April 25, 1952, Serial No. 284,414

3 Claims. (Cl. 210—24)

The present invention relates to the use of ion-exchange resins and, more particularly, to the use of ion-exchange resins under conditions which result in appreciable loss of resin by fracture.

Initially, ion-exchange was used primarily in softening water employing mineral ion-exchange materials. For example, ions that cause hardness in water, such as calcium or magnesium, were replaced by an equivalent concentration of sodium ions. Subsequently, a number of resins were developed which are useful in the deionization of water and in the separation or recovery of many ionic materials from aqueous solutions. In addition to the adaptation of resins to ion-exchange in aqueous solution, it has been discovered that these resins can be used to remove ionic materials from organic fluids such as petroleum fractions.

These subsequent applications of ion-exchange resins have had to depend for their practical operations upon the experience and equipment developed for and used in the older applications. Consequently, when new problems are encountered peculiar to the new use, the old art does not provide the solutions. Thus, for example, in the old operation of softening water, the change in the pH of the resin and its environment is insignificant. On the other hand, in the deionizing of water, the pH of the resin and of its environment may change from acid to base and back to acid during the treating, backwashing and regenerating cycle. Such a change in pH of the resin and/or its environment causes the resin ion-exchange material to swell and contract.

Similarly, during the cycle in which an organic fluid is contacted with an ion-exchange resin, backwashed and regenerated with an aqueous solution the resin also may expand and contract. In fact, it is known that while some ion-exchange materials will expand about 10 percent under such conditions as a marked change in pH of the resin and/or its environment or successive contact with organic liquids and aqueous solutions, other ion-exchange resins under similar conditions will expand and contract more than 100 percent.

It is also known that under such conditions there is an uneconomic loss of ion-exchange resin due to fracture and floating off of the fines produced in the present equipment designed in accordance with the prior art principles of the older techniques.

In general, the ion-exchange equipment presently employed is simply a tank of such size as to provide an ion-exchange material bed of sufficient depth to obtain the required degree of contact necessary to attain practical extraction by the ion-exchange resin of the ion or compound to be removed from the liquid being treated and also to provide sufficient "free-board" above the bed of ion-exchange material to permit expansion of the bed during backwash. It has been general practice to provide beds of from two to six feet in depth, shallower beds being too thin to provide the degree of contact necessary to practical operation.

In uses wherein the expansion and contraction of the particles of resin is at a minimum, loss due to fracture is not so great as to seriously affect the economics of the operation. On the other hand, in operations involving marked change of pH or alternate contact with organic and aqueous media, the loss due to fracture and floating off of the fines from the bed is great.

The fracturing of the particles of resin is due to causes which were not definitely known. However, it has now been discovered that the loss of resin through fracturing can be reduced as much as 40 percent by reducing the compression upon the resin particles through reducing the depth of the bed about 60 percent. Accordingly, it is an object of the present invention to provide a method using ion-exchange resins wherein the loss of resin due to fracture is reduced to a practical minimum. It is another object of the present invention to provide a means for contacting ion-exchange resins with liquid media to be treated in which the loss of resins due to the formation of fines will be reduced to a practical minimum. It is a further object of the present invention to provide a means for contacting ion-exchange resin with liquid media in which compression of the resin particles is reduced to a practical minimum. Other objects and advantages will become apparent from the following description taken in conjunction with the drawing which is a more or less diagrammatic illustration at least partly in section of an apparatus for conducting contact of fluid media with an ion-exchange resin.

In general, the present invention provides a means for contacting a fluid medium from which an ion or a compound is to be extracted by an ion-exchange resin in which the compression of the particles of resin is reduced to a practical minimum, provision for expansion of the individual particles is made and efficient extraction can be achieved.

As has been emphasized hereinbefore, beds of ion-exchange resin are in many uses subjected to wide changes in pH. Thus, for example, a resin of the weekly acidic type, i. e., in which the functional groups are carboxylic groups when used to extract a cation at the inception of the extraction step is acid. During the extraction step the pH of the resin increases. For example, such a resin may swell approximately 50 percent on transformation from the hydrogen to the sodium form. Particle swelling increases with increasing pH and at a pH of about 10, resin expansion is about 100 percent. This change is reversible. Similarly, a basic resin when used to extract an anion passes from a basic form to an acid state during which there is an increase in volume of each resin particle of about 5 percent or more. Similarly, an anion exchange resin in the hydroxyl form expands more than 50 percent when liquid medium is changed from a gasoline to water. During the regeneration cycle there is a corresponding contraction. Accordingly, the present invention provides for means whereby the compression of the superposed resin particles is reduced to a minimum concomitant with practical design.

It is well known that a minimum bed depth is required to achieve practical extraction. This minimum bed depth varies with the material to be adsorbed and with the resin employed and is usually not less than about two feet and quite often is much more. The present invention provides for presenting the total required depth of bed in the form of a plurality of layers of minimum depth and not more than about twelve inches depth although it is preferred that the depth of each layer be not greater than about four inches. In addition, the cell within which each layer is confined is of such dimensions as to provide a volume in addition to that occupied by the resin when each particle is contracted at least equal to the additional volume occupied by the resin particles when fully expanded plus at least about 10 percent.

Thus, for example, let it be assumed that the total depth of bed required is two feet and that a plurality of beds each four inches in depth is to be employed. Further, let it be assumed that the resin is known to expand 100 percent. Then each compartment or cell will have an internal height of at least 8.4 inches. This will become manifest upon reference to the drawing in which 1 is a cylindrical shell provided with a discharge line 2 having valve 3, 4 and 5. The interior of shell 1 is divided into a plurality of superposed cells or compartments by foraminous plates 6. Plates, sheets, shelves 6 are of any suitable material inert to the solutions to be treated and the regenerating solutions, and can be metal screening, resinous material, nylon for example, ceramic material, glass or the like. Shelves 6 are provided with orifices 7. For example, presently available ion-exchange resins are sized to be substantially all through a 20-mesh screen and substantially all retained by a 60-mesh screen. The orifices 7 in the shelves 6 should be of such diameter as to retain the smallest whole resin particle but permit passage of liquid and of fractured resin particles or fines during backwash. Thus, plates 6 should be provided with holes or orifices 7 of about 0.0143 to about 0.0067 inch or about 0.363 to about 0.170 millimeter in diameter (70–150 mesh) when used with ion-exchange resins of the above size. Corresponding changes would be made in orifice size for resin particles with dimensions different from that indicated above.

Since treatment of liquids to remove ions or compounds is a cyclic operation, the contactor will be further described in conjunction therewith.

Before treating a liquid for removal of an ion or a compound, a layer of ion-exchange material is placed on each plate 6. Access to each shelf is obtained through hand holes 8 or shelves 6 can be mounted as a unit and lifted out of shell 1 for replacement or addition of exchange resin. Resin particles 9 are placed on each shelf 6 to a depth not greater than 12 inches and preferably to a depth not greater than 4 inches. For a resin which in a particular cycle swells to double its volume, the distance between successive plates 6 should be at least about 8.5 inches, while for a resin the particles of which swell only about 10 percent, the distance between successive shells should be about 5 inches. The total depth of all of the beds of ion-exchange resin should be at least that required for practical efficient extraction. Thus, for an extraction requiring a bed two feet in depth for practical extraction, six beds each of which is about 4 inches in depth can be employed.

The liquid to be treated is introduced into the contactor from a source, not shown, through one or more lines such as 10 provided with distributor 11 supported in any suitable manner. Distributor 11 can be in the form of the spokes of a wheel or any other form which provides for uniform distribution of the liquid to be treated over the entire area of the beds. The liquid to be treated is discharged onto the surface of bed 9 of the uppermost cell or compartment, passes through the bed of ion-exchange material and drains from cell 12 through orifices 7. In a similar manner, the liquid passes successively through cells 13, 14, 15, 16, 17, etc., until it reaches and passes through the lowermost cell or compartment. The treated liquid then drains into tank 18 from which it is drawn through pipe 2 with valve 3 open and valves 5 and 19 closed to storage or further treatment. One or more of the compartments can be provided with a sampling trough 20 having pipe 21 under control of valve 22 through which a sample of the treated liquid can be withdrawn to determine the extractive efficiency of the bed above the sampling trough.

When the resin is exhausted, valve 3 is closed, valve 19 opened and liquid introduced from a source not shown through line 23 to backwash the resin. The backwash rising through the successive compartments removes retained liquid to be treated and bead fines, and overflows into trough 24 and is drained from trough 24 through one or more lines 25. The regenerating solution is then introduced into the contactor from a source, not shown, through line 26 provided with one or more distributors 27 of any suitable design. The regenerating solution is withdrawn from the contactor through line 2 with valves 19 and 4 closed and valves 3 and 5 open. The resin is then ready for another cycle.

Thus, the present invention provides a method in which a liquid to be treated is passed through a plurality of beds of ion-exchange resin, the depth of each bed being not greater than 12 inches and preferably not greater than 4 inches, and the total depth of all of the beds through which the liquid to be treated is passed being at least equal to that required for practical extraction of the liquid being treated with the particular resin employed.

Figure 2:
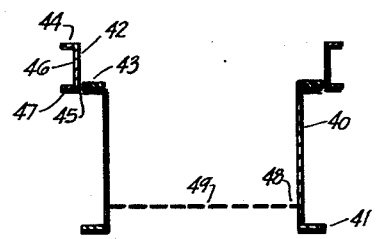
Figure 3:
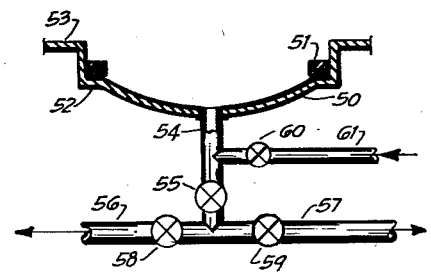

For flexibility the contactor can comprise a plurality of individual cells as illustrated in Figure 2 and a base such as illustrated in Figure 3. Each cell comprises a shell 40 of suitable material of structural strength inert to the liquid to be treated and the regenerating and other liquids passing through the cell. At the lower edge shell 40 is provided with a flange 41 which fits within the shoulder 42 constructed of flange 45 and upright 46. Flange 45 extends beyond upright 46 to provide an ear 47 through which a plurality of bolts or the like are inserted whereby successive cells can be held together in a rigid manner. The cell is also provided with an ear or flange 44 through which a plurality of bolts or the like are inserted whereby the superposed cell is held rigidly to the lower cell. In order to ensure that the contactor shall be liquid tight, a gasket 43 is provided of any suitable compressible material substantially inert to the liquids passing through the cells.

The contractor is assembled by placing a cell on the base 50 in such a manner that flange 41 rests on gasket 51 which in turn rests on shoulder 52. A plurality of bolts are then inserted in aligned holes in ear or flange 47 and flange or ear 53. The bolts are then drawn tight and another cell superposed on the first with holes in the lower ear or flange 44 of the second cell aligned with holes in the ear or flange 47 of the second cell. In such a manner a series of cells are superposed until the required depth of ion-exchange resin is obtained. Cell 40 is provided with a foraminous bottom or plate 48 having orifices 49 similar in structure to plates 6 of Figure 1.

Base 50 is similar to the base of the contactor illustrated in Figure 1. Base 50 is provided with a drain pipe 54 having valve 55. Attached to drain pipe 54 are two conduits 56 and 57 having valves 58 and 59. Backwash liquid is introduced into the assembled contactor from a source, not shown, through line 61 under control of valve 60.

Thus, the present invention provides for a plurality of cells in which the depth of the ion-exchange resin in any one cell is less than that which is accompanied by an appreciable loss of resin as fines and in which the total depth of the resin beds in all of the cells is at least that required for a practical extraction of the liquid to be treated. The present invention also provides a method of extracting ions or compounds from a liquid by contact with successive shallow beds of ion-exchange resin in which the depth of the resin in each bed is less than that which is accompanied by appreciable loss of resins as fines, and the total depth of the resin layers in all of the cells is sufficient to provide practical extraction of the liquid being treated.

We claim:

1. In the method of treating liquids to remove materials dissolved therein by contact with particles of ion-exchange resin of a type having a tendency, during each cycle where there is a marked change of pH or alternate contact with organic and aqueous media, for said particles of ion-exchange resin to expand and contract and to fracture due to compressive forces and for said fractured particles to float out of the contact zone, and which method comprises establishing a contact zone containing a bed of said particles of ion-exchange resin of minimum depth of at least two feet and sufficient to achieve practical extraction of undesired materials dissolved in a liquid to be treated, passing in a cyclic manner a liquid containing undesired material removable by contact with ion-exchange resin through said bed to obtain a treated liquid effluent of desired reduced concentration of said undesired dissolved material and a resin bed containing extracted undesired material, removing entrained liquid from said bed of ion-exchange resin, contacting said bed of ion-exchange resin with a resin regenerating liquid, and passing liquid to be treated through said bed of ion-exchange resin, the improvement which comprises minimizing the tendency of said particles to fracture by establishing a plurality of contact zones each containing a bed of ion-exchange resin not more than 12 inches in depth, the total depth of all of said beds of resin being at least equal to the aforesaid minimum depth sufficient to achieve practical extraction, and each of said contact zones having a volume at least equal to [V+(0.055 to 1.10)V] where V is the minimum volume of the contained bed of ion-exchange resin.

2. The improvement of claim 1 wherein the depths of the beds of ion-exchange resin are not more than 4 inches.

3. The improvement of claim 1 wherein the liquid to be treated is a petroleum fraction and the material to be removed is ionic material.

References Cited in the file of this patent

UNITED STATES PATENTS

| | | |
|---|---|---|
| 174,532 | Hulbert | Mar. 7, 1876 |
| 174,867 | Smith | Mar. 14, 1876 |
| 232,735 | Loomis | Sept. 28, 1880 |
| 308,575 | Puffer | Nov. 25, 1884 |
| 590,868 | Wanner et al. | Sept. 28, 1897 |
| 630,870 | Driesbach | Aug. 17, 1899 |
| 1,722,938 | Nordell | July 30, 1929 |
| 1,951,917 | Leslie | Mar. 20, 1934 |
| 1,985,377 | Lindenberger | Dec. 25, 1934 |
| 2,176,549 | Smith | Oct. 17, 1939 |
| 2,323,830 | McMillan | July 6, 1943 |
| 2,367,803 | Schindler | Jan. 23, 1945 |
| 2,370,190 | Ralston | Feb. 27, 1945 |
| 2,432,745 | Gary | Dec. 16, 1947 |
| 2,487,574 | Meng | Nov. 8, 1949 |
| 2,592,523 | Ayers et al. | Apr. 15, 1952 |
| 2,620,927 | Koupal | Dec. 9, 1952 |